United States Patent Office
3,359,271
Patented Dec. 19, 1967

3,359,271
PIPERAZINO-DIBENZ[b,f]-OXEPINONES AND THIEPINONES AND INTERMEDIATES
Walter Schindler, Riehen, and Erich Schmid, Basel, Switzerland, assignors to Geigy Chemical Corporation, Ardsley, N.Y., a corporation of New York
No Drawing. Filed Aug. 9, 1966, Ser. No. 571,174
Claims priority, application Switzerland, Apr. 29, 1965, 5,941/65; Dec. 1, 1965, 16,575/65; Feb. 11, 1966, 1,973/66
21 Claims. (Cl. 260—268)

ABSTRACT OF THE DISCLOSURE

The compounds are of the class of dibenzo[b, f]thiepin-10-(11H)-ones or dibenzo[b, f]oxepin-10(11H)-ones having a piperazinyl group in the 11-position and are useful as tranquilizers. An illustrative compound is 2-chloro - 11-(4-methyl-1-piperazinyl)-dibenz[b, f]thiepin-10(11H)-one.

CROSS-REFERENCE TO A RELATED APPLICATION

This application is a continuation-in-part of our pending patent application Ser. No. 544,684, filed Apr. 25, 1966, now abandoned.

DETAILED DISCLOSURE

The present invention concerns new thiepin and oxepin derivatives, their addition salt with inorganic and organic acids, processes for the production thereof, pharmaceutical compositions which contain the new compounds and their use as pharmaceutical agents. More particularly, this invention concerns compounds of the general formula (in which the carbon atoms have been numbered in accordance with Chemical Abstracts)

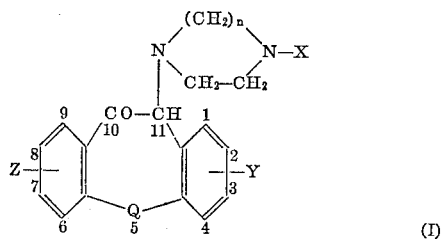

wherein

Q represents an oxygen or a sulphur atom,
X represents a hydrogen atom, a lower alkyl, hydroxy-lower alkyl or lower alkanoyloxy-lower alkyl group,
each of Y and Z represents hydrogen, halogen of an atomic number up to 35 inclusive, lower alkyl, lower alkoxy, or lower alkylthio, and
$n$ represents 2 or 3.

These compounds as well as their pharmaceutically acceptable salts with inorganic or organic acids possess valuable depressant activity on the central nervous system, potentiate the action of anaesthetics and have catatonic, sedative, relaxing and anti-convulsive activities, which properties characterize the compounds as tranquilizers (neuroleptics) for use for the treatment of mental disorders especially in excited phases, as well as of states of anxiety and tension. In addition to the central properties, the compounds also have peripheral pharmacological properties such as antihistaminic and musculotropic spasmolytic activity.

In the compounds of general Formula I, X as lower alkyl group can be, e.g. the methyl, ethyl, propyl, isopropyl, butyl, isobutyl or the sec. butyl group; as hydroxy-lower alkyl group it is, for instance, the 2-hydroxyethyl, 3-hydroxypropyl or the 2-methyl-3-hydroxypropyl group, and as lower alkanoyloxy-lower alkyl group it is, for instance, the 2-acetoxyethyl, 2-propionyloxyethyl, 3-acetoxypropyl, 2-methyl-3-acetoxypropyl, 3-propionyloxypropyl, 2-methyl-3-propionyloxypropyl, 2-pivaloyloxyethyl, 3-pivaloyloxypropyl or the 2-methyl-3-pivaloyloxypropyl group.

Y and Z can be both identical or different and, as substituents of the benzene rings, can be in the 1-, 2-, 3- or 4-position or in the 6-, 7-, 8-, or 9-position, the 2- and 8-positions being preferred; as lower alkyl radical they represent e.g. the methyl, ethyl, propyl, isopropyl, butyl or isobutyl group, as lower alkoxy radicals they represent e.g. the methoxy, ethoxy, propoxy, isopropoxy, butoxy or the isobutoxy group, and as lower alkylthio they represent e.g. the methylthio, ethylthio, propylthio, isopropylthio, butylthio or the isobutylthio group.

"Lower" as used in this specification and the appended claims in connection with an aliphatic moiety means that such moiety has maximally 6, and preferably from 1 to 4 carbon atoms.

The new compounds of general Formula I are produced by reacting a compound of general Formula II

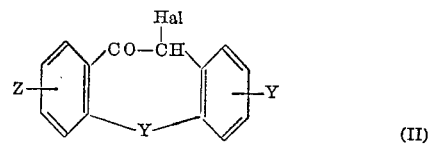

wherein

Hal represents a halogen atom, especially a chlorine or bromine atom, and
Q, Y and Z have the meanings given in Formula I, with a compound of general Formula III

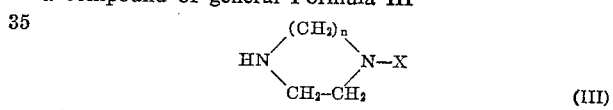

wherein X and $n$ have the meanings given in Formula I, the reaction being performed in the presence of a basic condensing agent, preferably in a solvent or diluent, if desired, treating a compound of general Formula I the radical X of which represents hydrogen with a low alkylene oxide, a reactive monoester of a low alkane diol, a reactive ester of a low alkanoyloxy alkanol or with a reactive ester of a low alkanol such as methanol and, if desired, converting a compound of general Formula I into an addition salt with an inorganic or organic acid.

Suitable solvents or diluents are hydrocarbons such as benzene, toluene or xylene, low alkanols such as methanol or ethanol, or an alkanoic acid amide such as dimethyl formamide. The reaction can be performed at a temperature of about 60–200°; sometimes it is to be performed in a closed vessel depending on the boiling point of the solvent and on the reaction temperature necessary. It is of advantage to use excess amine of the general Formula III or a tertiary organic base such as pyridine, lutidine, collidine, quinoline or quinaldine as acid binding agent. Such bases, used in excess, can also serve as solvents. Also, alkali or alkaline earth carbonates such as sodium carbonate or calcium carbonate are suitable as acid binding agents; these are preferably used in acetone or in an aqueous low alkanol such as ethanol.

In order to introduce a low hydroxyalkyl, alkanoyloxyalkyl group or alkyl group into the 4-position of the piperazine or hexahydro-1H-1,4-diazepine group of compounds of general Formula I the radical X of which represents hydrogen, such compounds are reacted, e.g. with β-bromoethanol, β-p-toluene sulphonyloxy ethanol, β-bromoethyl acetate or methyl or ethyl bromide in the presence of a suitable acid binding agent such as potassium or sodium carbonate in an organic solvent such as benzene, toluene, acetone or butanone, or with an alkylene oxide such as ethylene oxide or propylene oxide, in an inert organic solvent.

The starting materials of the general Formula II are obtained e.g. by starting from the known dibenzo [b, f] thiepin-10(11H)-one or derivatives substituted in the benzene nuclei which are produced analogously and reacting these, preferably in a solvent or diluent such as carbon disulphide, with halogen, especially with bromine or chlorine.

The compounds of general Formula I obtained according to the process of the invention are then converted in the usual way, if desired, into their addition salts with inorganic or organic acids. For example, the acid desired as salt component or a solution thereof, is added to a solution of a compound of general Formula I in an organic solvent. Preferably organic solvents are chosen for the reaction in which the salt formed dissolves with difficulty so that it can be isolated by filtration. Such solvents are, e.g. methanol, methanol/ether or ethanol/ether.

Instead of the free bases, non-toxic acid addition salts can be used as medicaments, i.e. salts with those acids the anions of which are pharmaceutically acceptable in the usual dosages. Also, it is of advantage if the salts to be used as medicaments crystallise well and are not or are only slightly hygroscopic. For salt formation with compounds of general Formula I, e.g. hydrochloric acid, hydrobromic acid, sulphuric acid, phosphoric acid, methane sulphonic acid, ethane sulphonic acid, β-hydroxyethane sulphonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid can be used.

The new active substances can be administered orally, rectally or parenterally. The daily dosages of the free bases or of non-toxic salts thereof vary between 10 and 800 mg. for adult patients. Suitable dosage units such as dragées (sugar coated tablets), tablets, suppositories or ampoules preferably contain 5–50 mg. of an active substance according to the invention or of a non-toxic salt thereof. Also, corresponding amounts of forms for administration not made up into single dosages can be used.

Dosage units for oral administration preferably contain between 1–90% of a compound of general Formula I or a non-toxic salt thereof as active substance.

They are produced, e.g. by combining the active substance with solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols (Carbowaxes) of suitable molecular weights, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Dosage units for rectal administration are, e.g. suppositories which consist of a combination of an active substance or a suitable salt thereof with a neutral fatty foundation, or also gelatine rectal capsules which contain a combination of the active substance or a suitable salt thereof with polyethylene glycols (Carbowaxes) of suitable molecular weight.

Ampoules for parenteral, particularly intramuscular, administration preferably contain a water soluble salt of an active substance in a concentration of, preferably, 0.5–5%, in aqueous solution, optionally together with suitable stabilisers and buffer substances.

The following prescriptions further illustrate the production of tablets and dragées:

(a) 250 g. of 11-(4-methyl-1-piperazinyl)-dibenzo [b,f]thiepin-10(11H)-one are mixed with 178.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets each weighing 100 mg. and containing 25 mg. of active substance. If desired, the tablets can be grooved for better adaptation of the dosage.

(b) A granulate is produced from 250 g. of 11-[4-(2-hydroxy - ethyl - 1 - piperazinyl] - dibenzo [b,f]thiepin-10(11H)-one dihydrochloride, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and the mixture pressed into 10,000 dragée cores. These are then coated with a concentrated syrup from 502.28 g. of crystallised saccharose, 6 g. of shellac, 10 g. of gum arabic, 0.22 g. of dyestuff and 1.5 g. of titanium dioxide and dried. The dragées obtained each weigh 120 mg. and contain 25 mg. of active substance.

The following examples illustrate the production of the new compounds of general Formula I and of hitherto undescribed intermediate products, but in no way limit the scope of the invention. The temperatures are given in degrees centigrade.

*Example 1*

(a) 45 g. of dibenzo[b, f]thiepin-10(11H)-one are dissolved in 250 ml. of carbon disulphide and 9.6 ml. of bromine in 50 ml. of carbon disulphide are added dropwise to the solution at 0 to 5° while stirring. The brown reaction mixture, which is stirred for another hour, loses its colour. It is then vaporated in vacuo, the residue is recrystallised from ethanol and 11-bromo-dibenzo[b, f]thiepin-10 (11H)-one is obtained, M.P. 105–106°.

(b) A solution of 30.5 g. of the bromoketone prepared according to (a) and a solution of 20 ml. of 4-methylpiperazine in 20 ml. of dimethyl formamide are heated for half an hour at 100° and then poured into a large quantity of water. The reaction mixture is made alkaline with concentrated sodium hydroxide solution and extracted with diethyl ether. The basic parts are removed from the ethereal extract with 2 N hydrochloric acid. The acid solution is made alkaline with concentrated sodium hydroxide solution and the free bases are extracted with diethyl ether. The ethereal solution is washed with water, dried over sodium sulphate and concentrated in vacuo. The residue is distilled under high vacuum at 197°/ 0.02 torr and the distillate is fractionally crystallised from ethanol. A first fraction from 80 ml. of ethanol, which melts at 210°, consists of a by product. After concentrating the mother liquor, 11-(4-methyl-1-piperazinyl)-dibenzo[b, f]thiepin-10(11H)-one is obtained which, after recrystallisation from benzine, melts at 101.5°.

Dibenz[b, f]thiepin-10(11H)-one used as starting material is produced in a known manner by condensation of a thiosalicyclic lower alkyl ester and bromobenzene as by F. Mayer in Berichte, 42, 1135 (1909) to the compound of the formula

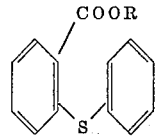

wherein R is lower alkyl, reduction to the compounds carbinol, bromination of the carbinol to the corresponding bromo methyl derivative; substitution of bromine in the latter by the cyano group to obtain the nitrile, hydrolysis of the latter to the corresponding phenylacetic acid derivative and finally ring closure; this whole procedure being described in detail by Mirwald, Inaugural Dissertation, University of Saarbrücken, Germany, 1961.

Halogen-, alkyl-, alkoxy- and alkylthio-substituted dibenz thiepins are prepared in exactly the same manner for the correspondingly substituted thiosalicyclic acid and/or bromobenzene.

Example 2

30 g. of the bromoketone obtained according to Example 1(a) and 35 g. of 1-piperazinoethanol are heated at 160–170° for 20 hours. After cooling to room temperature, the reaction solution is extracted with ether. The ether extract is washed with water, dried over sodium sulphate, evaporated and ethanolic hydrochloric acid is added to the residue. The 11-[4-(2-hydroxyethyl)-1-piperazinyl]-dibenzo[b, f]thiepin-10(11H)-one dihydrochloride obtained is recrystallised from ethanol; it melts at at 174–175°.

Example 3

Starting from one of the 11-bromo-dibenzo[b, f]thiepin-10(11H)-one given below under (a) to (d) and reacting this bromo-keto-compound according to the procedure of Example 1(b) with 4-methyl-piperazine, the final compounds also given below are obtained:

(a) With 11-bromo-2-chlorodibenzo[b, f]thiepin-10 (11H) - one, 2-chloro - 11-(4-methyl-1-piperazinyl)-dibenzo[b, f]thiepin-10(11H)-one, M.P. 167–170° (from ethanol), (b) With 11-bromo-3-chlorodibenzo[b, f]thiepin-10 (11H)-one, 3-chloro-11-(4-methyl-1-piperazinyl)-dibenzo[b, f]thiepin-10(11H)-one, M.P. 136–139° (from benzine), (c) With 11-bromo-8-chlorodibenzo[b, f]thiepin-10 (11H)-one, 8-chloro-11-(4-methyl-1-piperazinyl)-dibenzo-[b, f]thiepin-10(11H)-one, M.P. 153–157° (from acetonitrile), with decomposition, (d) With 11-bromo-8-methylthio-dibenzo[b, f]thiepin-10(11H)-one, 8-methylthio-11-(4-methyl-1-piperazinyl)-dibenzo[b, f]thiepin-10(11H)-one, (e) With 11-bromo-2-methoxydibenzo[b, f]thiepin-10 (11H)-one, 2 - methoxy-11-(4-methyl-1-piperazinyl)dibenzo[b, f]thiepin-10(11H)-one, M.P. 122–124.5° (from nitromethane), and (f) With 11-bromo-8-methylthiodibenzo[b, f]thiepin-10(11H)-one, 8-methylthio-11-(4-methyl-1-piperazinyl)-dibenzo-[b, f]thiepin-10(11H)-one.

Example 4

Starting from one of the 11-bromo-dibenzo[b, f]thiepin-10(11H)-one given below under (a) to (d) and reacting this bromo-keto-compound according to the procedure of Example 2 with 1-piperazino ethanol, the final compounds also given below are obtained:

(a) With 11-bromo-2-chloro-dibenzo[b, f]thiepin-10 (11H)-one, 2 - chloro - 11-[4-(2-hydroxyethyl)-1-piperazinyl]dibenzo[b, f]thiepin-10(11H)-one, M.P. 195–197° (monochlorhydrate), (b) With 11-bromo-3-chloro-dibenzo[b, f]thiepin-10 (11H)-one, 3 - chloro-11-[4-(2-hydroxyethyl)-1-piperazinyl]dibenzo[b, f]thiepin-10(11H) - one, M.P. (base) 147–151° (from cyclohexane/benzol), (c) With 11-bromo-8-chloro-dibenzo[b, f]thiepin-10 (11H)-one, 8-chloro-11-[4-(2-hydroxyethyl)-1-piperazinyl]dibenzo[b, f]thiepin-10(11H)-one, M.P. (base) 144–148° (from acetonitrile), (d) With 11-bromo-2-methoxy-dibenzo[b, f] thiepin-10(11H)-one, 2-methyl-11-[4-(2-hydroxyethyl)-1-piperazinyl]-dibenzo[b, f]thiepin-10(11H)-one, M.P. (base) 140–143° (from nitromethane), and (e) With 11-bromo-8-methylthio-dibenzo[b, f]thiepin-10(11H) - one, 8-methylthio-11-[4-(2-hydroxyethyl)-1-piperazinyl]-dibenzo[b, f]thiepin10(11H)-one.

Example 5

(a) A solution of 29 g. of 11 - bromo-dibenz[b, f]oxepin-10(11H)-one in 200 ml. of abs. benzene is added dropwise within half an hour to a stirred solution of 22 g. of 4-methyl piperazine in 80 ml. of abs. benzene and the mixture is stirred for 20 hours at 50–55°. The reaction solution is then washed with 500 ml. of water and the organic phase is extracted with 2 N hydrochloric acid. The acid extract is made alkaline with concentrated sodium hydroxide solution and the precipitated base is extracted with ether. The ether extract is washed with water, dried over sodium hydroxide and evaporated in vacuo. The residue is taken up in dry acetone and abs. ethanolic hydrochloric acid is added until it has a reaction acid to congo paper. The precipitated 11-(4-methyl-1-piperazinyl) dibenz[b, f]oxepin-10(11H)-one dihydrochloride dihydrate is filtered off under suction, washed with dry acetone and recrystallised from abs. ethanol; it melts at 177–198° with decomposition.

The starting material, 11 - bromo-dibenz[b, f]oxepin-10(11H)-one, is obtained as follows:

(b) 52.5 g. of dibenz[b, f]oxepin-10(11H)-one are dissolved in 250 ml. of carbon disulphide and, while stirring the solution at 0–5°, 40 g. of bromine in 140 ml. of carbon disulphide are added dropwise within 1 hour. The brown reaction mixture is stirred for 1 hour during which it loses its colour. It is then evaporated in vacuo, the residue is recrystallised from ethanol and 11-bromo-dibenz-[b, f]oxepin-10(11H)-one is obtained, M.P. 94.5–96.8°.

Example 6

29 g. of 11 - bromo-dibenz[b, f]oxepin-10(11H)-one in 180 ml. of dry acetone are added dropwise within 30 minutes to 29 g. of 1-piperazino ethanol in 100 ml. of dry acetone, the addition being made while stirring. The reaction solution is boiled for 5 hours. The reaction mixture is then concentrated in vacuo and the residue is taken up in ether. The ether solution is washed with water, extracted with 2 N hydrochloric acid and the acid extract is made alkaline with concentrated sodium hydroxide solution. The precipitated base is taken up in ether, the ether solution is washed with water, dried over sodium hydroxide and concentrated in vacuo. The pale orange residue is taken up in dry acetone and abs. ethanolic hydrochloric acid is added to the acetone solution until there is a congo acid reaction. The precipitated 11-[4-(2-hydroxyethyl)-1-piperazinyl] - dibenz[b, f]oxepin-10(11H) one dihydrochloride is filtered off under suction, washed with dry acetone and recrystallised from ethanol; it melts at 185–189° with decomposition.

Example 7

The following compounds are obtained in an analogous manner according to Example 5(a) and 5(b):

(a) From 2 - chloro - 11 - bromo-dibenz[b, f]oxepin-10(11H)-one with 4-methyl piperazine, 2-chloro - 11-(4-methyl - 1 - piperazinyl)-dibenz[b, f]oxepin-10(11H) one dihydrochloride hydrate, M.P. 218–225° with decomposition, and (b) From 2 - chloro-dibenz[b, f]oxepin-10(11H)-one with bromine, the intermediate product 2 - chloro - 11- bromo-dibenz[b, f]oxepin - 10(11H)-one, M.P. 111–113.8° from ethanol.

Example 8

Starting from 2 - chloro - 11 - bromo-dibenz[b, f]oxepin-10(11H)-one and reacting it analogously to Example 6 with 1-piperazino ethanol, the 2 - chloro - 11-[4-(2 - hydroxyethyl) - 1 - piperazinyl]-dibenz[b, f]oxepin-10(11H)-one is obtained; M.P. (hydrochloride) 189–193° (from abs. ethanol), with decomposition.

We claim:
1. A compound selected from among thiepin and oxepin derivatives of the formula

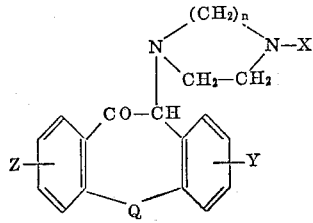

(I)

wherein
Q represents oxygen or sulphur,
X represents hydrogen, lower alkyl, hydroxy-lower alkyl or lower alkanoyloxy-lower alkyl,
each of Y and Z represents a member selected from among hydrogen, halogen up to the atomic number 35, lower alkyl, lower alkoxy, and lower alkylthio, and
n represents 2 or 3,
and their pharmaceutically acceptable addition salts with acids.

2. A compound as defined in claim 1 wherein
X represents hydrogen, methyl or hydroxyethyl,
each of Y and Z represents a member selected from among hydrogen, chlorine and lower alkoxy.

3. A compound as defined in claim 1 wherein said derivative is 11-(4-methyl-1-piperazinyl)-dibenzo[b, f]thiepin-10(11H)-one.

4. A compound as defined in claim 1 wherein said derivative is 2-chloro-11-(4-methyl-1-piperazinyl)-dibenzo[b, f]-thiepin-10(11H)-one.

5. A compound as defined in claim 1 wherein said derivative is 2-methoxy-11-(4-methyl-1-piperazinyl)-dibenzo-[b, f]thiepin-10(11H)-one.

6. A compound as defined in claim 1 wherein said derivative is 11-[4-(2-hydroxyethyl)-1-piperazinyl]-dibenzo[b, f]-thiepin-10(11H)-one.

7. A compound as defined in claim 1 wherein said derivative is 2-chloro-11-[4-(2-hydroxyethyl)-1-piperazinyl]-dibenzo[b, f]-thiepin-10(11H)-one.

8. A compound as defined in claim 1 wherein said derivative is 11-(4-methyl-1-piperazinyl)-dibenz[b, f]oxepin-10(11H)-one or its dihydrochloride salt.

9. A compound as defined in claim 1 wherein said derivative is 11-[4-(2-hydroxyethyl)-1-piperazinyl]-dibenz[b, f]-oxepin-10(11H)-one or its dihydrochloride salt.

10. A compound as defined in claim 1 wherein said derivative is 2-chloro-11-(4-methyl - 1-piperazinyl)-dibenz[b, f]oxepin10(11H)-one or its dihydrochloride salt.

11. A compound as defined in claim 1 wherein said derivative is 2-chloro-11-[4-(2-hydroxyethyl)-1-piperazinyl]-dibenz[b, f]oxepin-10(11H)-one or its hydrochloride salt.

12. A compound as defined in claim 1 wherein said derivative is 8-methylthio-11-(4-methyl-1-piperazinyl)-dibenz[b, f]thiepin-10(11H)-one.

13. A compound as defined in claim 1 wherein said derivative is 8-methylthio-11-[4-(2-hydroxyethyl)-1-piperazinyl]-dibenz[b, f]thiepin-10(11H)-one.

14. A compound of the formula

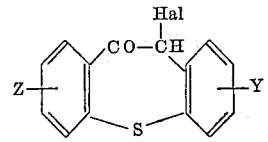

(II)

wherein
Hal represents halogen,
each of Y and Z represents hydrogen, halogen up to the atomic number 35, lower alkyl lower alkoxy or lower alkylthio.

15. A compound as defined in claim 14 wherein said compound is 11-bromo-dibenzo[b, f]thiepin-10(11H)-one.

16. A compound as defined in claim 14 wherein said compound is 11-bromo-2-chlorodibenzo[b, f]thiepin-10(11H)-one.

17. A compound as defined in claim 14 wherein said compound is 11-bromo-3-chlorodibenzo[b, f]thiepin-10(11H)-one.

18. A compound as defined in claim 14 wherein said compound is 11-bromo-8-chlorodibenzo[b, f]thiepin-10(11H)-one.

19. A compound as defined in claim 14 wherein said compound is 11-bromo-2-methoxydibenzo[b, f]thiepin-10(11H)-one.

20. 11-Bromo-2 - chlorodibenz[b, f]oxepin-10(11H)-one.

21. A compound as defined in claim 14 wherein said compound is 8-methylthio-11-bromo-dibenz[b, f]thiepin-10(11H)-one.

References Cited

UNITED STATES PATENTS 3,144,442  8/1964  Schindler et al. _____ 260—239

OTHER REFERENCES

Kimoto et al., Chemical Abstracts, vol. 54 (1960), col. 14, 285e.

HENRY R. JILES, *Primary Examiner.*